(12) United States Patent
Vice

(10) Patent No.: US 7,134,373 B1
(45) Date of Patent: Nov. 14, 2006

(54) THROAT INSERT FOR A TABLE SAW

(76) Inventor: James Perry Vice, 288 Boeing Ct., Livermore, CA (US) 94551

( * ) Notice: Subject to any disclaimer, the term of this patent is extended or adjusted under 35 U.S.C. 154(b) by 0 days.

(21) Appl. No.: 10/785,854

(22) Filed: Feb. 23, 2004

(51) Int. Cl.
B27B 5/20 (2006.01)
(52) U.S. Cl. .................... 83/477.2; 83/471.2; 83/477.1
(58) Field of Classification Search ............... 83/471.2, 83/477.1, 477.2
See application file for complete search history.

(56) References Cited

U.S. PATENT DOCUMENTS 2,569,914 A * 10/1951 Appleton .................... 220/245
3,269,433 A * 8/1966 Packard et al. ............ 83/477.2
3,285,303 A * 11/1966 Kwiatkowski ............. 83/477.1
5,159,864 A * 11/1992 Wedemeyer et al. .......... 83/13
6,076,445 A * 6/2000 Kenyon et al. ............ 83/477.2
6,216,575 B1 * 4/2001 Dils ........................ 83/522.17

* cited by examiner

Primary Examiner—Charles Goodman
(74) Attorney, Agent, or Firm—Risto A. Rinne, Jr.

(57) ABSTRACT

An apparatus for use with a table saw to decrease a clearance of a surface surrounding a saw blade includes a throat plate that is inserted into an elongated slot that is provided in the surface of the table saw. The throat plate includes an enlarged opening with a pair of spaced-apart rails that, together, are adapted receive a replaceable T-shaped center portion. The center portion is cut by the saw blade as the blade is raised from below the center portion resulting in a space around the blade having a clearance that approximates the kerf of the blade. Screws secure the center portion in the enlarged opening. A pair of cam screws secures the throat plate in the elongated slot. A side to side adjustable splitter is attached to the throat plate.

13 Claims, 2 Drawing Sheets

THROAT INSERT FOR A TABLE SAW

BACKGROUND OF THE INVENTION

1. Field of the Invention

The present invention, in general, relates to power tools and, more particularly, to an accessory for use with a table saw.

Table saws are well known tools used for cutting wood. They are used by homeowner and professional woodworker alike. All table saws have a blade on an arbor that is adapted to be raised for cutting boards at various heights or lowered below a throat plate.

The throat plate fits into a generally universally-sized elongated slot, sometimes referred to as a "throat" that is recessed in the top surface of the table saw. When installed, the top surface of the throat plate is flush with the top surface of the table saw.

The throat plate itself includes an opening for the blade to enter so that it may be extended to a position that is above the table saw surface. However, because many different types of saw blades, including wider dado blades can be used with the table saw, the opening that is provided in the throat plate by the table saw manufacturer must be large enough to accommodate the expected range of saw blade sizes.

When cutting boards on a table saw, it is preferable that the opening in the throat plate be as close to the size of the blade that is in the table saw as is possible. A precision opening that ideally is only a few thousandths of an inch larger than the saw blade decreases the amount of area intermediate the saw blade and the surrounding surface of the throat plate.

When a board is being cut, a small opening between the throat plate and the saw blade provides for optimum stability of the board. A small opening helps prevent tilting of the board that is being cut as it passes near the blade. It also helps prevent a possible snagging (i.e., resistance) of the board by the rear of the opening in the throat plate. This can occur if contact of the board with a rear portion of a large opening in the throat plate were to occur.

To solve this general need, after-market throat plates have been designed that include a replaceable center portion that fits in an enlarged central opening that is provided in the throat plate. The replaceable center portion is cut by initially raising the saw blade a desired amount. The resultant opening produced exceeds the size of the saw blade by the kerf of the blade, a very small amount. This is especially desirable.

However, current after-market throat plates have certain limitations. The replacement throat plate is not securely attached to the elongated slot provided in the top surface of the table saw into which it fits. The only known method of securement includes spring loaded detents that permit the after-market throat plate to easily be dislodged from the elongated slot. This is potentially dangerous.

Also, the replaceable center portion is not securely held in position within the replacement throat plate. Movement of the replaceable center portion can cause increased erosion (by the saw blade) which increases the size of the opening. It also allows for unwanted and unpredictable contact between the saw blade and the replaceable center portion. This can produce sudden unexpected sounds that can disturb a user.

There is also a danger that the replaceable center portion can be ejected, possibly at high speed, from the after-market throat plate. If two things go wrong at the same time a potentially serious situation can arise. For example, if the throat plate should become dislodged during use this could cause the replacement center portion to make contact with the blade. The replacement center portion can then be ejected forward, impelled by energy and speed imparted by the spinning blade. The replacement center portion can then become a projectile, possibly striking the operator. This is an extremely dangerous, possibly even a fatal scenario that is especially important to avoid.

Also, a device known as a "splitter" in the woodworking arts is sometimes included as part of a factory produced table saw throat plate by the manufacturer. The splitter is a protrusion that is located on the rear of the throat plate.

The splitter is in alignment with the plane of a standard-width type of a saw blade, one that is intended typically to rip the board lengthwise. The splitter can also be used with a blade that is intended to make a "cross-cut" in the board but its benefits are less important when a shorter type of a cut is being made. Whenever one is cutting a board, typically, as narrow a width for the saw blade as is possible is preferred (to avoid excessive waste of the board).

The splitter generally matches the width of the saw blade. It may be slightly narrower but it is not generally wider than the width of the blade. The splitter is intended to enter into the space where the cut is occurring at a predetermined distance after the blade. The splitter then holds the two cut halves apart, which prevents the board segments that have been cut from coming together and possibly "pinching" the saw blade.

Pinching can produce an irregular cut (at best) or cause binding of the blade or possibly even a burning of the board. It also subjects the cut board to unstable irregular forces that are imparted by the saw blade. In particular, a force vector tending to raise the board off of the table saw surface (as a rear of the saw blade that is most likely to be contacted during pinching is rising up from the surface) is imparted to the board when it is being pinched from the rear of the blade.

Therefore, a splitter is a desirable safety device to be included in a throat plate and many woodworkers accordingly prefer the presence of one. However, including one in an after-market throat plate has not hereto before been possible because of variation in the plane of the blade with respect to the throat plate occurring from one manufacturer to another and possibly even from one model to another produced by the same manufacturer.

Therefore, after market throat plates for table saws with a splitter are unavailable.

Accordingly, there exists today a need for a throat insert for a table saw that helps ameliorate the above-mentioned difficulties.

Clearly, such an apparatus would be a useful and desirable device.

2. Description of Prior Art

Replacement throat insert plates are, in general, known. For example, the following patent describes one such type of device:

U.S. Pat. No. 5,159,864 to Wedemeyer et al, Nov. 3, 1992.

While the structural arrangement of the above described device, at first appearance, has similarities with the present invention, it differs in material respects. These differences, which will be described in more detail hereinafter, are essential for the effective use of the invention and which admit of the advantages that are not available with the prior device.

OBJECTS AND SUMMARY OF THE INVENTION

It is an object of the present invention to provide a throat insert for a table saw that includes a replaceable center portion that fits in an enlarged central opening.

It is also an important object of the invention to provide a throat insert for a table saw that includes a replaceable center portion that fits in an enlarged central opening and which includes means for securing the replaceable center portion in the enlarged central opening.

Another object of the invention is to provide a throat insert for a table saw that includes means for securing the insert in an elongated slot provided in the surface of a table saw.

Still another object of the invention is to provide a throat insert for a table saw that includes a replaceable center portion that fits in an enlarged central opening and which includes at least one screw adapted for securing at least one of a pair members that extend from the replaceable center portion in the enlarged central opening.

Still yet another object of the invention is to provide a throat insert for a table saw that includes a replaceable center portion having a generally T-shaped cross-section that is adapted to fit in an enlarged central opening provided in the insert.

Yet another important object of the invention is to provide a throat insert for a table saw that includes means for maintaining a minimum width between two halves of a board being cut after the cut has been partially accomplished.

Still yet another important object of the invention is to provide a throat insert for a table saw that includes a splitter that is adapted for maintaining a minimum width between two halves of a board being cut after the cut has been partially accomplished.

Still one further and important object of the invention is to provide a throat insert for a table saw that includes a splitter that is adapted for maintaining a minimum width between two halves of a board being cut after the cut has been partially accomplished, the splitter being adapted to move in a direction that is perpendicular to a plane of a blade in the table saw.

Briefly, a throat insert for a table saw that is adapted to fit into a generally universally-sized elongated slot, sometimes referred to as a "throat", that is provided in the surface of the table saw that is constructed in accordance with the principles of the present invention has an enlarged central opening, a portion of which extends to one end of the insert. The enlarged opening includes a pair of parallel, spaced-apart rails that extend along a longitudinal length of the enlarged opening. A replaceable center portion includes a generally T-shaped cross-section that slides into and out of the enlarged central opening from the open end. Recessed screws are provided that are adapted to bear down on the extended members of the T-shaped replaceable center portion sufficient to retain it in position. A pair of edge-mounted cam screws are each tightened to secure the insert in the elongated slot.

DETAILED DESCRIPTION OF THE INVENTION

Figure 1:
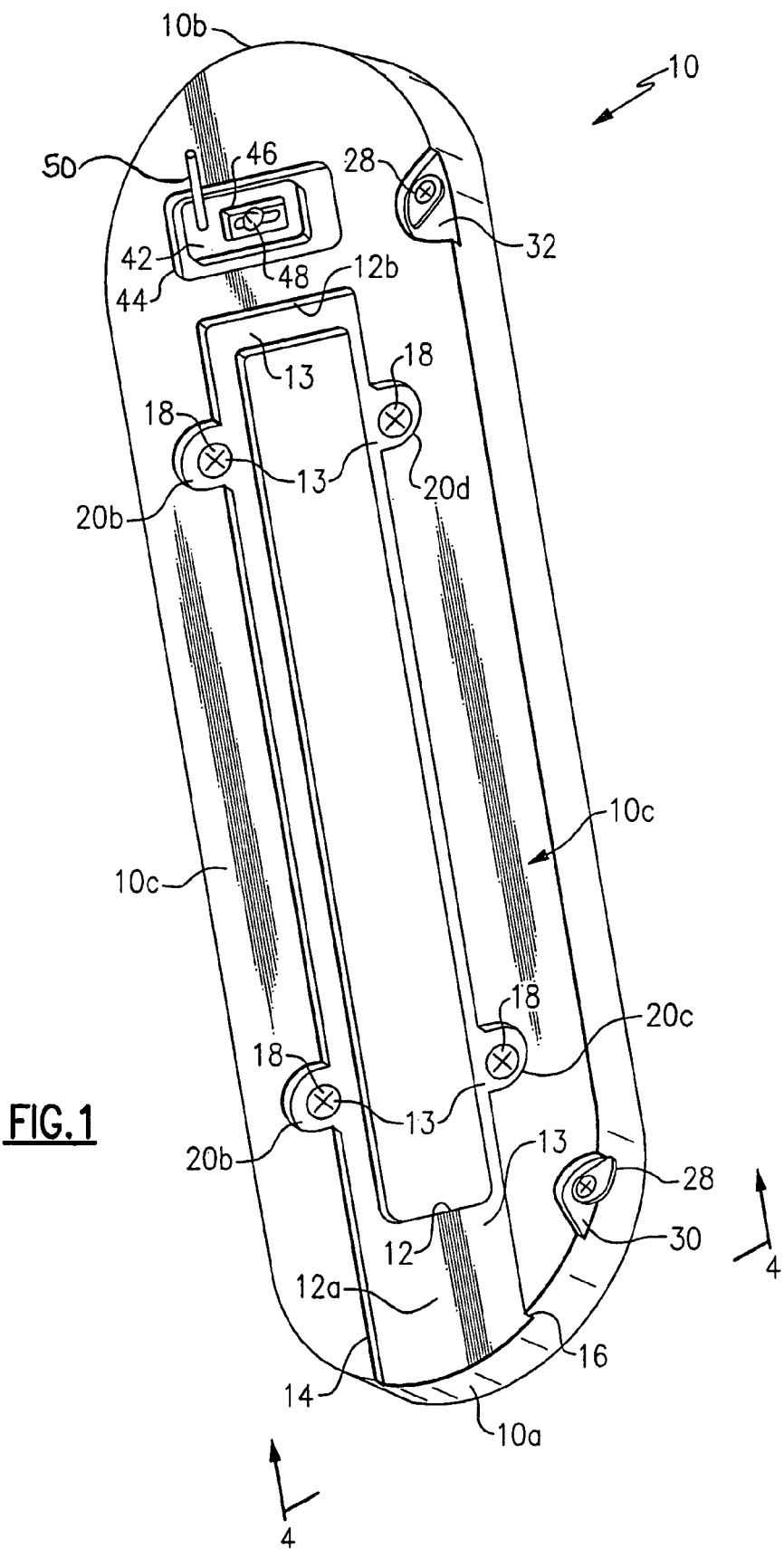
FIG. 1 is a view in perspective of an insert for a table saw with a portion of a center replacement insert partially removed.

Referring to all of the drawings and in particular to FIG. 1 is shown, a throat insert for a table saw (not shown), identified in general by the reference numeral 10.

The throat insert 10 is a substantially planar member having a length that exceeds a width and a width that exceeds a thickness. The throat insert 10, also known as a throat plate, is adapted to fit into a generally universally-sized elongated slot, sometimes referred to as a "throat" (not shown), that is provided in the surface of the table saw. The throat insert 10 rests on a perimeter rail (not shown) that is provided in a bottom of the elongated slot. The insert 10 matches the overall shape of the elongated slot, but it is a few thousandths of an inch smaller than the elongated slot so the insert 10 can fit therein.

The throat insert 10 includes an enlarged central opening 12, a first portion 12*a* of which is disposed proximate a first end 10*a* of the insert 10.

The throat insert 10 includes the first end 10*a* and an opposite second end 10*b*. A blade (not shown) of the table saw is raised for use through the central enlarged opening 12 above a surface of the table saw and retracted under the throat insert 10 when not in use or for blade changing, etc.

The enlarged opening 12 is larger than the anticipated size of any blade that is intended for use with the table saw.

A top plane 10*c* of the throat insert 10 is at the same elevation as the surface of the table saw.

The enlarged opening 12 includes a pair of parallel, spaced-apart rails 14, 16 that extend along a longitudinal length of the enlarged opening 12.

An opening rim 13 extends around the enlarged opening 12. The rim 13 includes a flat plane that extends along a bottom of the spaced-apart rails 14, 16 and along the top of the first portion 12*a* of the opening 12 in a contiguous plane to the first end 10*a* of the insert 10.

One of four retaining screws 18 are located each in one of four recesses 20*a*–20*d* that extend into the enlarged opening 12. The rim 13 extends into each of the four recesses 20*a*–20*d*.

Each retaining screw 18 is threaded into a hole provided in the recess (20*a*–*d*). When tightened the retaining screw 18 is urged toward the flat plane of the rim 13.

Figure 2:
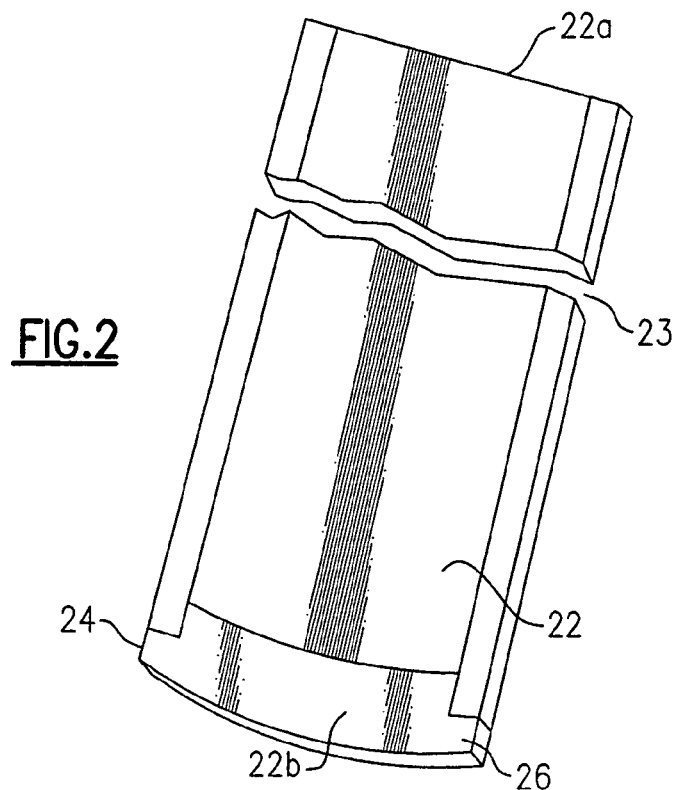
FIG. 2 is a view in perspective of a portion of a center replacement insert for the insert of FIG. 1.

Referring now also to FIG. 2, a portion of a replaceable center portion 22 that includes a generally T-shaped cross-section is shown which includes a pair of members 24, 26. The center portion 22 is a contiguous one piece part that extends the full length of the enlarged opening 12. Its entire length is not shown. A gap 23 represents the missing portion of the center portion 22.

The members 24, 26 are disposed on opposite sides of the replaceable center portion 22 and extend longitudinally along the length of the replacement center portion 22.

The portion of the replaceable center portion 22 intermediate the pair of members 24, 26 includes a thickness that exceeds that of either of the members 24, 26.

The replaceable center portion 22 includes a flat first end 22*a* and a curved opposite second end 22*b*. The flat end 22*a* corresponds with the shape of a rear second portion 12*b* of the enlarged opening 12. The curved opposite end 22*b* corresponds with the shape of the first end 10*a* of the insert 10.

The replaceable center portion 22 is intended to be inserted into the enlarged opening 12. To insert the replaceable center portion 22 into the opening 12, the flat end 22a is inserted first so that the members 24, 26 align with and fit into the rails 14, 16, respectively.

The replaceable center portion 22 is then urged along the length of the rails 14, 16 until the flat end 22a rests against the second portion 12b of the enlarged opening 12. When fully inserted, the curved opposite end 22b aligns over the first end 10a of the insert 10. When fully inserted, the portion of the replaceable center portion 22 intermediate the pair of members 24, 26 is flush (i.e., level) with the top plane 10c of the insert 10.

Figure 4:
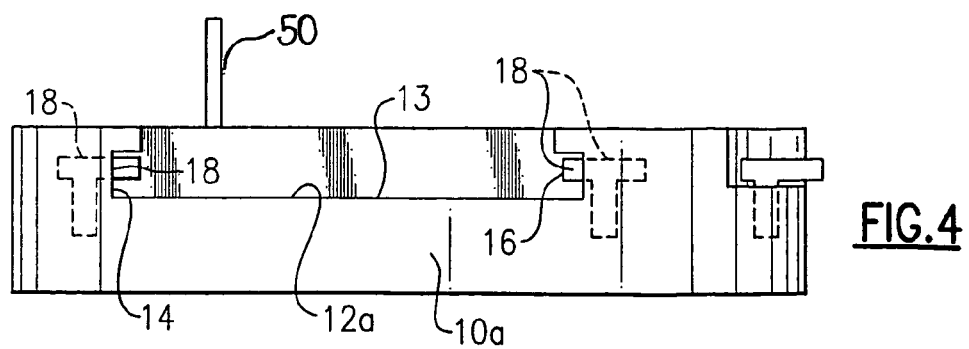
FIG. 4 is an end view of the insert of FIG. 1 taken along the line 4—4.

The retaining screws 18 are then tightened sufficient so that a portion of the top rim of each retaining screw 18 bears down on a portion of the members 24, 26 urging the members 24, 26 firmly against the rim 13 (See a portion of the retaining screws 18 in FIG. 4). When tightened, the tops of the retaining screws 18 do not extend above the top plane 10c of the insert 10.

The replaceable center portion 22 is formed of any preferred material that can be readily cut by the blade. Wood is the most common material choice, followed by certain types of plastics.

After the center portion 22 is mounted and fastened in the insert 10, the insert 10 is placed in the universally-sized elongated slot (i.e., throat) of the table saw after having first fully lowered the blade so that the top of the blade is disposed below the elongated slot. The first end 10a is disposed toward the front of the table saw (where the operator is located) and the opposite second end 10b is disposed to the rear of the elongated slot, behind the back of the blade.

Once placed therein, the center portion 22 cannot possible be dislodged (even if the screws 18 were loose) because the elongated slot includes a perimeter sidewall that surrounds the entire insert 10, thereby retaining the center portion 22 within the elongated slot.

However, the screws 18 are especially useful in that they prevent any possible escape of the center portion 22 from the insert 10. The screws 18 also prevent any movement of the center portion 22 from occurring within the insert 10.

This eliminates chatter (i.e., noise arising from the center portion 22 vibrating) as well as any noise should it vibrate into contact with a spinning blade. The screws 18 also prevent any possibility that the center portion 22 might be unintentionally ejected from the enlarged opening 12 during use, even if the insert 10 were somehow to become dislodged from the elongated slot.

When inserted into the elongated slot, the top plane 10c of the insert and a top surface of the center portion 22 (i.e., that portion intermediate the members 24, 26) are flush with the top surface of the table saw.

Figure 3:
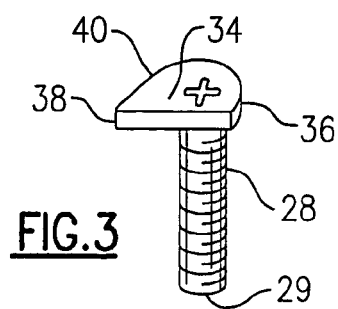
FIG. 3 is a view in perspective of a cam screw of FIG. 1.

Referring now momentarily to FIG. 3, a pair of cam screws 28 are threaded into holes provided proximate a side of the insert 10, one each preferably near the two opposite ends 10a, 10b.

A pair of corresponding side recesses 30, 32 are provided to receive the cam screws 28, which when properly threaded into the holes in the side recesses 30, 32 include an upper surface that is below the top plane 10c of the insert 10.

The cam screws 28 include a generally increasing diameter top 34 that forms an eccentric with respect to a threaded shaft 29. The top 34 includes a close portion 36 that does not extend far from the shaft 29 and a distal portion 38 that is maximally disposed away from the shaft 29. An increasing-distance arcuate edge 40 extends from the close portion 36 to the distal portion 38.

The cam screw 28 includes a conventional machine thread. When the insert 10 is first inserted into the elongated slot of the table saw, the cam screws 28 are each adjusted so that the close portion 36 is disposed along the outside perimeter of the insert 10. This prevents the cam screws 28 from interfering with (i.e., contacting) the elongated slot.

After the insert 10 is fully disposed within the elongated slot, the cam screws 28 are tightened in a normal clockwise fashion. This causes the arcuate edge 40 of each cam screw 28 to increasingly extend outward beyond the perimeter of the insert 10 until each arcuate edge 40 makes contact with the inside perimeter of the elongated slot.

Continued tightening of each cam screw 28 then applies a force to the insert 10 that tends to urge the insert 10 within the elongated slot in a direction that is away from the cam screws 28. Accordingly, the insert 10 is forced tightly against the opposite side of the elongated slot. Having the two cam screws 28 disposed proximate opposite ends 10a, 10b of the insert 10 helps to ensure proper positioning and tightening of the insert 10 within the elongated slot.

Additional continued tightening of the cam screws 28 then sets the insert 10 securely in position in the elongated slot. When fully tightened, the cam screws 28 lock securely in place. This secures the insert 10 in the elongated slot so that an upward force, if applied to the insert 10, will not dislodge the insert 10 from its location within the elongated slot.

It is important to note that the entire process of tightening each cam screw 28 is quick and includes making only a partial revolution of each cam screw 28 to fully secure the insert 10 in the elongated slot.

To use the insert 10, the table saw motor is energized and the spinning blade is slowly raised sufficient so that it cuts a slot, beginning at the bottom, and eventually extending up through the center portion 22. This is why it is important that the center portion 22 be formed of a material that the blade can cut through. The slot that is cut by the blade exceeds the width of the blade by the kerf of the blade and thereby provides a nearly zero clearance surface proximate the blade.

It is again important to note that as the blade is raised to cut the slot through the center portion 22 a force is applied to the center portion 22, and therefore also to the rest of the insert 10, that attempts to raise the insert 10 upward and out of the elongated slot. With prior art designs, this is potentially dangerous. However, the cam screws 28 are easily adapted to resist this upward force thereby greatly improving the safety of the insert 10.

Furthermore, should a careless user forget to tighten the cam screws 28, there is danger that if a dull blade is quickly raised, the insert 10 might tend to rise out of the elongated slot. Even though this constitutes misuse of the insert (by failing to tighten the cam screws 28), the retaining screws 18 provide a fail-safe mechanism that prevents the center portion 22 from being expelled forward and out through the first portion 12a.

Referring again to FIG. 1, a sliding member 42 is disposed in a rectangular recess 44 provided for that purpose. When the sliding member 42 is in the rectangular recess 44, a top of the sliding member 42 is flush with the top plane 10c of the insert 10.

A sliding member slot 46 is provided in the sliding member 42. The sliding member slot 46 includes a longitudinal axis that is perpendicular to the plane of the blade when the insert 10 is disposed within the elongated slot. A sliding member retaining screw 48 passes through the sliding member slot 46 and engages with a threaded hole provided in the insert 10 in the rectangular recess 44.

When the sliding member retaining screw 48 is loosened, the sliding member 42 is free to move within the rectangular recess 44 from side to side, perpendicular with respect to the plane of the blade. When the sliding member retaining screw 48 is tightened, the sliding member 42 is secured in a desired position.

A splitter post 50 extends upward from the sliding member to a predetermined height, as desired. The splitter post 50 includes a preferred diameter that is close to the width or kerf of the blade, but not substantially greater.

The splitter post 50 is intended to include any preferred shape. It can be round, oval, or preferably it will include a forward tapered portion that tapers in front (nearest the blade) to a line and extends back to a desired thickness. The splitter post 50 can include a planar member with a tapered forward portion, as desired. Having the forward portion thinner than the widest part of the splitter post 50 helps the splitter post 50 align with and enter easily into a kerf, as is described in greater detail hereinafter.

In use, the sliding member retaining screw 48 is loosened and the sliding member 42 is urged from side to side while visually sighting down along the plane of the blade. When the splitter post 50 is disposed to the rear of the blade and in alignment with the plane of the blade, the sliding member retaining screw 48 is tightened and the splitter post 50 is retained in the proper position.

Accordingly, a method is provided whereby the replacement throat insert 10 plate can also include a splitter post 50 that can be adjusted to align with the plane of the blade.

Furthermore, if it were desired, a modified sliding member could be provided to substitute in place of the sliding member 42 that includes a different size of splitter post (not shown) that is either higher or wider than standard. Accordingly, a method is provided whereby different sizes of splitter posts can be used with the replacement insert 10.

The splitter post 50 does not in any way "split" apart the board that is being cut. Rather, it maintains the split that has already been cut into the board. The splitter post 50 enters into the kerf (i.e., the cut portion) of the board after which it helps to maintain the two cut halves of the board in a spaced-apart and generally parallel relationship with respect to each other. This prevents pinching of the blade by the two cut halves from occurring.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An insert for a table saw, comprising:
   (a) a planar member that is adapted to fit into an elongated recess provided in a top surface of said table saw;
   (b) an enlarged opening that is provided through said planar member and which is adapted to allow a portion of a table saw blade to extend from said table saw to a position that is above said top surface;
   (c) a pair of parallel, spaced-apart rails that extend along a longitudinal length of the enlarged opening from a distal end to a front of said planar member;
   (d) wherein a cross-section of said enlarged opening that also passes through said pair of parallel spaced-apart rails includes a T-shape, and
   (e) locking means adapted for securing said insert in said elongated recess, wherein said locking means includes at least one cam that is adapted to pivot about an axis that is perpendicular to said planar member, and wherein when said at least one cam is pivoted about said axis, said cam is adapted to bear against a portion of said elongated recess sufficient to place said insert under tension, and wherein said cam is adapted to pivot about said axis when said insert is disposed fully in said elongated recess; and
   (f) including means adapted for preventing two halves of a board that is being cut from being urged toward each other an amount sufficient to pinch said saw blade, and wherein said means adapted for preventing two halves of a board includes means for disposing a splitter post behind said blade and in line with a center of a plane of said blade sufficient to allow said splitter post to enter into a kerf of a cut produced by said blade in said board, and including a sliding member that is disposed in a sliding member recess that is provided in said insert and wherein a top surface of said sliding member is not disposed above an upper surface of said insert and wherein said sliding member is adapted to be urged from side to side in a direction that is perpendicular with respect to said plane of said blade and including means for securing said sliding member in a desired location in said recess and wherein said splitter post is attached to said sliding member.

2. The insert of claim 1 including a replaceable center insert that includes a substantially planar shape having a center section and a pair of attached parallel, spaced apart members, each of said pair of members disposed on one side of said center section wherein said center insert is adapted to fit in said enlarged opening and wherein each of said members is adapted to fit into a corresponding one of said pair of parallel, spaced-apart rails sufficient to slide said center insert into or out of said insert.

3. The insert of claim 2 wherein a cross-section of said center section and said pair of members includes a T-shape that corresponds with said T-shape of said enlarged opening.

4. The insert of claim 2 wherein said center section of said replaceable center insert includes a greater thickness than that of either of said members and wherein when said replaceable center insert is disposed in said enlarged opening, a top surface of said center insert is at the same plane as said top surface of said table saw.

5. The insert of claim 2 wherein said center insert includes a material that is adapted to be cut by said blade.

6. The insert of claim 5 wherein said center insert includes wood.

7. The insert of claim 2 wherein said insert includes means for securing said replaceable center insert in said enlarged opening.

8. The insert of claim 7 wherein said means for securing includes at least one screw adapted to engage with screw threads provided in a hole in said insert, wherein when said center insert is disposed in said enlarged opening and said one screw is tightened, a portion of a head of said one screw is adapted to make contact with a portion of one of said pair of members of said center insert sufficient to urge said one of said pair of members against a rim that is provided and which surrounds at least a portion of said enlarged opening.

9. The insert of claim 8 wherein said at least one screw is recessed a sufficient amount so that a top of said head of said one screw is disposed below a top surface of said insert.

10. The insert of claim 9 wherein said at least one screw includes a plurality of screws and wherein each of said plurality of screws is disposed in its own corresponding recess and wherein a threaded shaft of each of said screws is disposed adjacent to one of said pair of members and wherein said each corresponding recess is attached at one end thereof to said enlarged center and wherein said each corresponding recess extends away from said center insert.

11. The insert of claim 7 wherein said center insert includes a length that exceeds its width and a first end and an opposite second end and wherein when said center insert is disposed in said enlarged opening said first end of said center insert is disposed adjacent to a rear second portion of said enlarged opening, said rear second portion being disposed opposite with respect to said front of said planar member.

12. The insert of claim 11 wherein said first end of said center insert is substantially flat and said second end of said center insert is curved.

13. The insert of claim 1 wherein said at least one cam includes at least one cam screw wherein said at least one cam screw includes a head that is eccentric with respect to said axis and wherein said axis includes a threaded shaft, said threaded shaft adapted to engage with a corresponding threaded hole disposed in said insert proximate a side of said insert.

* * * * *